---

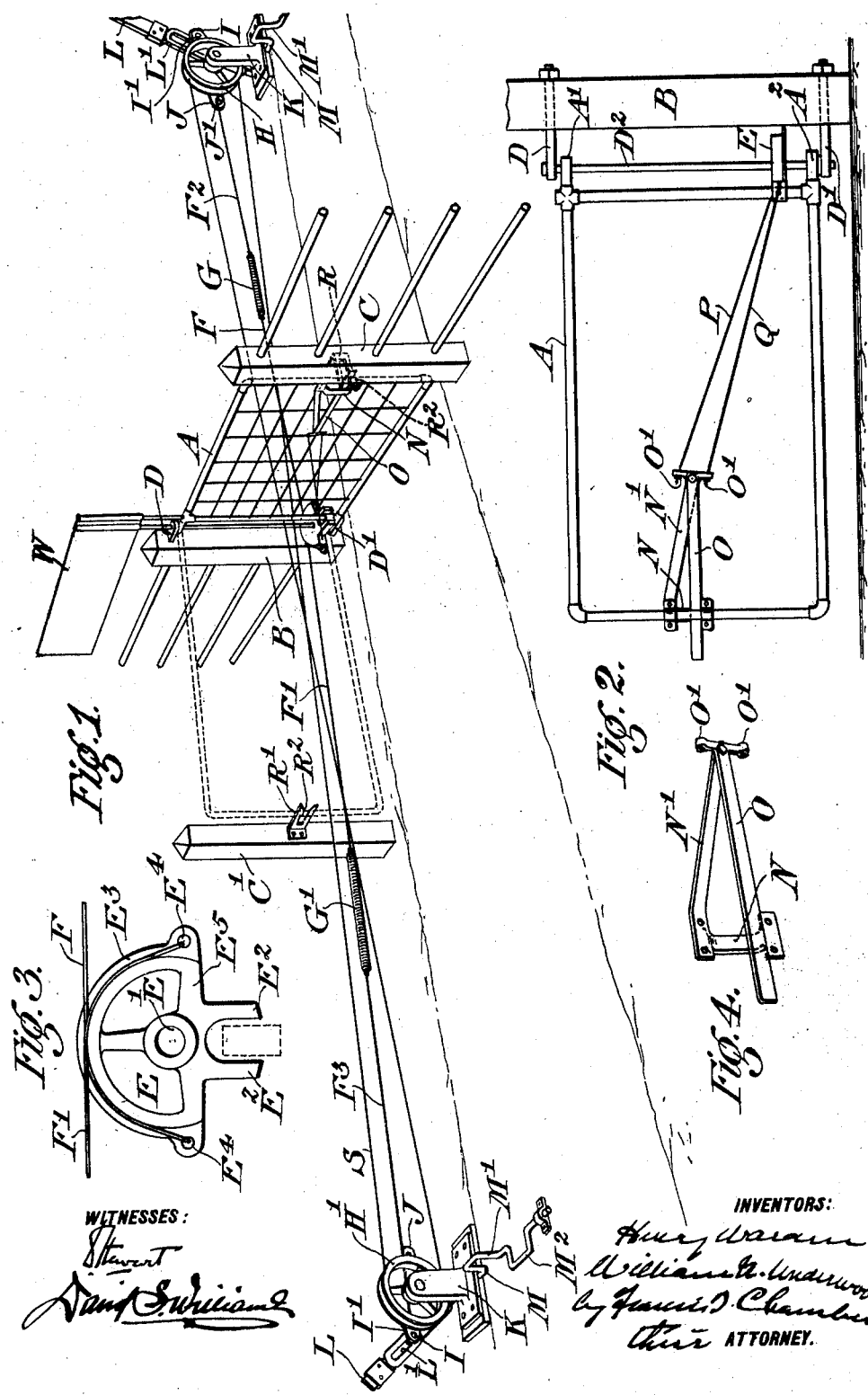

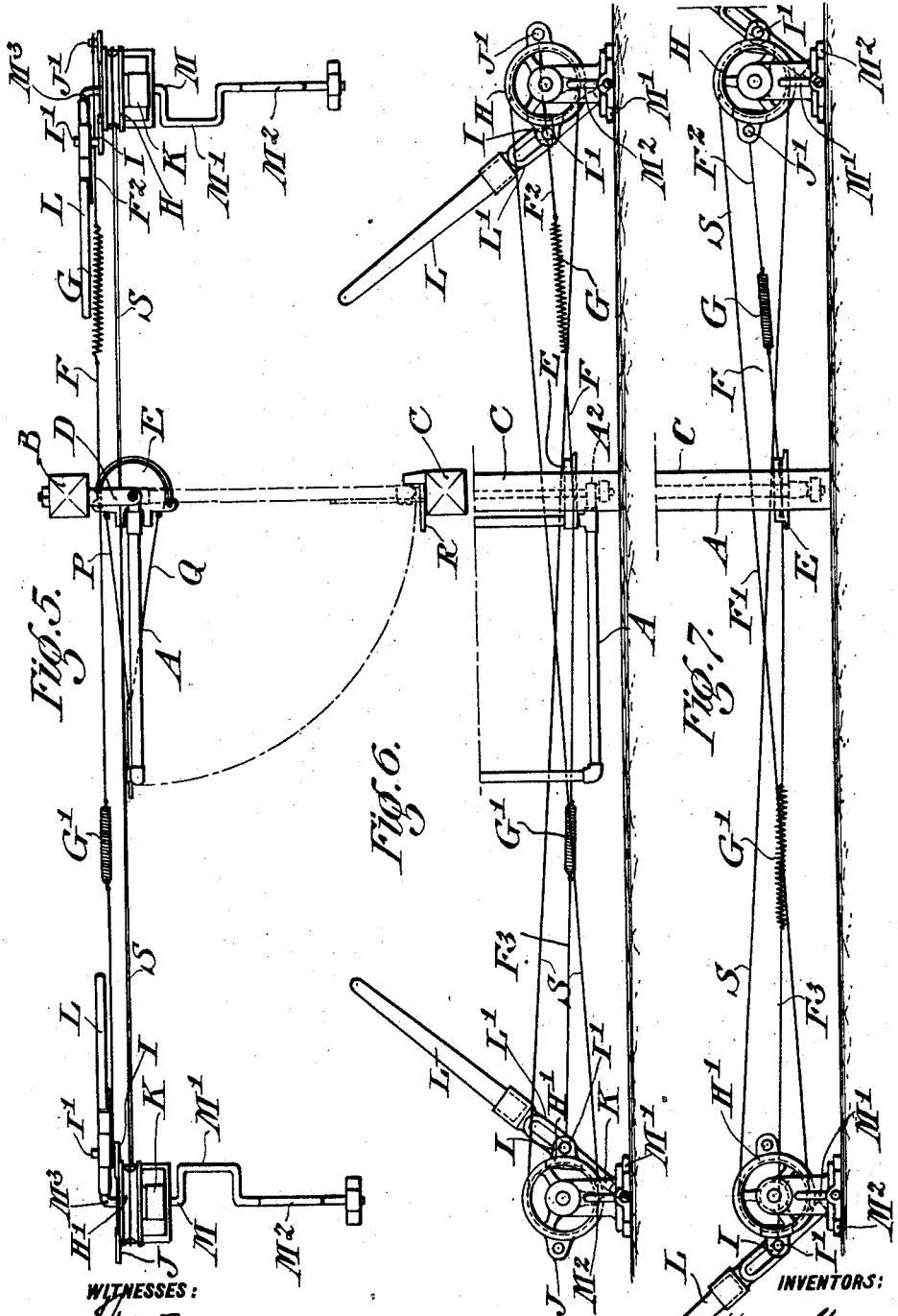

UNITED STATES PATENT OFFICE.

HENRY WARDEN AND WILLIAM N. UNDERWOOD, OF FREDERICKSBURG, VIRGINIA.

GATE-OPERATING MECHANISM.

998,311.  Specification of Letters Patent.  Patented July 18, 1911.

Application filed October 12, 1910. Serial No. 586,592.

*To all whom it may concern:*

Be it known that we, HENRY WARDEN and WILLIAM N. UNDERWOOD, citizens of the United States of America, residing in Fredericksburg, in the county of Spotsylvania and State of Virginia, have invented a certain new and useful Improvement in Gate-Operating Mechanism, of which the following is a true and exact description, reference being had to the accompanying drawings, which form a part thereof.

The present invention relates to gate opening and closing mechanisms and particularly to such mechanisms as are adapted to be engaged and actuated by a vehicle moving through the gate.

The primary object of the invention is to provide simple, effective and durable mechanism for the purpose specified, characterized by its simplicity and effectiveness, and by its durability and reliability.

The invention embraces various features of construction and arrangement hereinafter pointed out in the claims and in the accompanying drawings and descriptive matter we have illustrated and described one of the forms in which the invention may advantageously be employed.

Of the drawings, Figure 1 is a perspective view of a gate and operating mechanism therefor. Fig. 2 is an elevation of the gate. Fig. 3 is a plan view of part of the gate operating mechanism. Fig. 4 is a perspective view of the gate latch and support.
Fig. 5 is a diagrammatic plan of the gate and operating mechanism therefor. Fig. 6 is a diagrammatic elevation of the gate and operating mechanism, showing the gate in the open position. Fig. 7 is a view taken similarly to Fig. 6 showing the gate in the closed position.

In the drawings, A represents the gate proper shown as comprising a frame of metal piping and lattice like filling.
B represents the gate post to which the gate is hinged at one end and C represents the gate post at the opposite end of the gateway.

$C^1$ represents a post serving as a stop for the free end of the gate when the latter is left open.

In the form shown the gate is hinged to the post B by means of eyes D and $D^1$ secured to the post B, eyes $A^1$ and $A^2$ carried by the gate proper, and a pintle member $D^2$ which passes through the alined apertures in the eyes or brackets D and $D^1$ and $A^1$ and $A^2$. Mounted on the pintle member $D^2$ is a member E formed with an aperture $E^1$ through which the pintle $D^2$ passes and with a curved pulley sector like portion $E^3$ concentric with the aperture $E^1$ and provided with jaws $E^2$ loosely straddling the rear edge of the gate proper, thus permitting of a limited relative motion between the gate and the member E, for a purpose hereinafter described.

To rotate the member E and thereby open and close the gate, flexible members F and $F^1$, which may be cords or chains are secured to the member E and extend in opposite directions to the sector from the peripheral portion $E^3$. The members F and $F^1$ may be secured to the member E in any suitable manner, as by fastening them in the apertures $E^4$. The ends of the members F and $F^1$ remote from the member E are connected to other flexible members $F^2$ and $F^3$, respectively, by tension springs G and $G^1$ respectively. The member $F^3$ is connected to a pulley sheave $H^1$ and the member $F^2$ is connected to a similar pulley sheave H. The sheaves H and $H^1$ are journaled in similar pedestals or supports K, arranged on opposite sides of the gateway, and preferably at a sufficient distance therefrom, so that a vehicle traveling at a moderate rate of speed, (say six miles an hour or so), past either support K toward the gateway and actuating the gate operating mechanism to open the gate as it passes such support, will be permitted to pass through the gateway without slowing up. This usually makes it desirable to have the support for the sheave $H^1$ toward which the gate opens more remote from the gateway than the support for the sheave H. The two sheaves H and $H^1$ are each shown as formed with a pair of diametrically opposed ears I and J. The member $F^3$ is secured to a pin $I^1$ held in the ear I of the sheave $H^1$ and the member $F^2$ is secured to a pin $J^1$ mounted in the ear J of the sheave H. To rotate the sheaves H and $H^1$, similar actuating means are provided. The actuating means for each sheave include a rod-like member M the body of which is located at the ground level and extends transverse to the roadway. Each member M is formed with two bent crank portions $M^1$ and $M^2$ extending at right angles to each other and at its back end each member M has an upturned portion M³ which has secured to it a lever arm L, formed with a slotted or Scotch yoke portion L¹ to receive a pin carried by the corresponding sheaves. The slot L¹ in the lever L pertaining to the sheave H¹ receives the pin I¹ thereof and the slot L¹ of the lever L pertaining to the sheave H receives a pin I¹ carried in the ear I of the sheave H. The sheaves H and H¹ are connected to turn together but in opposite directions by means of band S which may be formed wholly of cord, cable, or chain, or partly of cord, cable or chain and partly of wire or the like.

When the gate is closed as shown in Fig. 1, the pins I¹ of the two sheaves H and H¹ are each at the side of its sheave remote from the gate and the levers L are correspondingly both inclined away from the gate. The cranks M¹ and M² are so set that in this condition of the apparatus both cranks M¹ are vertical and each crank M² is horizontal and extends away from the gateway. A vehicle approaching the gateway from either side and engaging the corresponding crank M¹ moves the latter into a horizontal position and directly raises the connected crank portion M² into the vertical position. This, by means of the lever L attached to the member M engaged by the vehicle and the pin and slot connection between the lever and the corresponding sheave rotates the latter through an angle, preferably as shown, of about 180°. The connection between the two sheaves formed by the band S cause the remote sheave and attached parts to be correspondingly rotated. As the sheave H is rotated its pin I¹ is carried from the position occupied by it in Figs. 1 and 7 into the position occupied by it in Figs. 5 and 6. This puts the spring G, connecting the members F and F², under tension and thereby exerts a torque on the sector carrying member E which tends to move the gate from the closed position shown in Fig. 1 into the full line or open position shown in Fig. 5. At the same time the tension on the spring G¹, connecting the members F¹ and F³ is released and the gate opens. When, thereafter, the vehicle moving away from the gateway engages either of the crank portions M² and the sheaves H and H¹ are rotated back into positions shown in Figs. 1 and 7 and the tension on the spring G is released while the spring G¹ is put under tension and the gate is moved back into the closed position. The gate can be operated, of course, by a person on foot or horseback through the levers L.

With the arrangement described, it will be observed that the pin I¹ of each of the sheaves H and H¹, when at the end of its movement in the direction to put tension on the corresponding spring G or G¹ engages the bottom of the corresponding lever slot L¹, and when the spring G¹ is under tension, a line drawn through center of pin I¹ of sheave H¹, and through member E passes below the center of H¹; and when spring G is under tension, a line drawn through the center of the pin J¹ of sheave H and through member E passes above the center of the sheave H. In consequence, when the sheave H¹ is rotated into the gate closed position the tension of the spring G¹ tends to hold it in that position. Similarly the tension of spring G tends to hold the sheave H in the gate open position after it has been rotated into that position. The provision of the springs G and G¹ permit of quick simultaneous movements of the members M and the sheaves H and H¹ without imparting a jerk or corresponding quick movement to the gate. At the same time energy is stored up in the spring put under tension to produce the corresponding opening or closing movement of the gate at the desired speed.

To lock the gate in either its open or closed position a latch O is provided, which in the form shown, is pivoted to the free end of an arm N¹. The arm N¹ is in the form of a rearwardly extending projection from a yoke N which is secured to the swinging end of the gate and serves as a keeper or guide for the latch bar O. The posts C and C¹ are provided with corresponding catch members R and R¹. The catch members R and R¹ may be alike but are turned upside down with respect to each other. To lift or depress the latch O and free it from the catch R or R¹, as the gate starts to open or close, the latch bar is provided at its pivoted end with oppositely extending arms or ears O¹ connected by cords or tension members P and Q to the apertured ears E⁴ formed on the member E at opposite sides of the aperture E¹. The lost motion between member E and the gate is sufficient to lift the latch bar through the tension member P on the initial movement of the member E in the direction to open the gate and through member Q to depress the latch bar on the initial movement of the member E in the gate closing position sufficiently to clear the locking shoulder R² of the corresponding catch R or R¹.

To prevent the latch bar from rebounding out of the catch on R or R¹ the mouths of the latch receiving openings therein are preferably made only slightly greater in width than the depth of the latch bar. The character of the latch operating means makes much clearance unnecessary.

To avoid interference from the wind with the gate opening and closing movements, we may advantageously attach to the gate a balancing wing or vane W.

While in accordance with the provisions of the statutes we have illustrated and described the best form of our invention now known to us, it will be apparent to those skilled in the art, that many changes may be made in the form of the apparatus disclosed without departing from the spirit of our invention.

Having now described our invention, what we claim as new and desire to secure by Letters Patent, is:

1. The combination with a gate, operating mechanism therefor, comprising a pair of actuators one at each side of the gateway connected together for simultaneous movements between gate opening and gate closing positions, a pair of resilient connections one between the gate and each of said actuators, and each so connected to the gate and to the corresponding actuator that one of said connections is put under tension by a movement of the actuators into the gate closing position and the other upon a movement of the actuators into the gate opening position and the connection under tension in either of said positions acts on the actuator to which it is connected in a direction tending to hold the latter in the position maintaining the tension of said last mentioned connection.

2. A pair of pivoted members one at each side of the gateway connected together for simultaneous turning movements between gate opening and gate closing positions, provisions limiting the movement of said members beyond said positions, and a pair of resilient connections, one between the gate and said member, one put under tension by a movement of said members into the gate opening position and the other by the movement into the gate closing position and each when under tension tending to hold said members against the provisions for preventing their further turning movement in the direction in which they were turned to create such tension.

3. In combination, a gate and operating mechanism therefor, comprising a pair of actuating devices, one at each side of the gateway and a resilient connection between the gate and each actuating device, said actuating devices each including a pair of members pivotally supported to turn about axes laterally displaced from each other and connected to each other by a sliding pivotal connection permitting restricted oscillatory movements of said members toward and away from a position in which the resilient connection to said device is put under tension tending to hold said members in such position and to produce a corresponding movement of the gate.

4. In combination, a hinged gate and operating mechanism therefor, comprising a member connected to the gate and capable of movement with respect thereto, gate operating means engaging said member and adapted, on an initial actuation in the gate opening operation, to move said member relative to the gate in one direction, and on an initial actuation in the gate closing operation, to move said member relative to the gate in the opposite direction, a locking member mounted on said gate, connections between said members, whereby said locking member is moved relatively to the gate in opposite directions on movements relative to the gate in opposite directions of the first mentioned member, and stationary locking provisions coöperating with said locking member when the gate is in the closed position and other stationary locking provisions coöperating with said locking member when the gate is in the open position.

5. In combination a gate, and operating mechanism therefor comprising a pair of actuating devices one at each side of the gate and a resilient connection between the gate and each actuating device, each actuating device including two members pivotally supported to turn about axes laterally displaced from each other and connected to each other by a sliding pivotal connection permitting restricted oscillatory movements of said members about their axes, toward and away from a position which puts the resilient connection under tension tending to hold the members against a return movement and to move the gate, and a member connected to one of said pivoted members and comprising two crank portions set 90° apart and adapted one to be engaged by the wheels of a vehicle moving toward the gate and the other by the wheels of a vehicle moving away from the gate.

6. In combination a gate and operating mechanism therefor comprising actuating devices at each side of the gateway, a resilient connection between the gate and each actuating device said actuating devices each including a lever and a pulley sheave pivotally supported to turn about axes laterally displaced from each other and connected to each other by a sliding pivotal connection permitting restricted oscillatory movements of said lever and sheave toward and away from a position in which the resilient connection to said device is put under tension tending to hold said members in such position and to produce a corresponding movement of the gate, said lever having an extension for manual actuation and crank like extensions adapted to be engaged by a vehicle moving through the gateway in either direction and a band connection between the sheaves of the two devices for causing them to turn simultaneously.

7. In combination a gate and operating mechanism therefor, comprising a pair of actuated devices one at each side of the gate and a resilient connection between the gate and each actuating device, each actuating device including two members pivotally supported to turn about axes laterally displaced from each other and connected to each other by a sliding pivotal connection so that a turning movement of one member of approximately 90° will produce a turning movement of the other member of approximately 180°, while said members interlock through said connection to prevent further turning movement of the members in the same direction beyond a position which puts the resilient connection under tension tending to hold the members against return movement and to move the gate.

HENRY WARDEN.
WILLIAM N. UNDERWOOD.

Witnesses:
L. MORRISON,
ELLERBE W. CARTER.

Copies of this patent may be obtained for five cents each, by addressing the "Commissioner of Patents, Washington, D. C."